Patented July 24, 1923.

1,462,732

UNITED STATES PATENT OFFICE.

ROLAND L. ANDREAU, OF WILMINGTON, DELAWARE, ASSIGNOR TO E. I. DU PONT DE NEMOURS & COMPANY, OF WILMINGTON, DELAWARE, A CORPORATION OF DELAWARE.

PRODUCTION OF PHOSPHORUS OXYCHLORIDE.

No Drawing.   Application filed October 26, 1920.  Serial No. 419,753.

*To all whom it may concern:*

Be it known that I, ROLAND L. ANDREAU, a citizen of the United States, and a resident of Wilmington, in the county of New Castle and State of Delaware, have invented a certain new and useful Production of Phosphorus Oxychloride, of which the following is a specification.

This invention relates to the manufacture of phosphorus oxychloride, and comprises inducing a reaction between phosgene and a phosphate of a metal capable of forming a chloride fusible at the temperature of the reaction.

In an investigation of processes of making phosphorus oxychloride with which I am familiar, it was found that this substance could be prepared by treating calcium phosphate with phosgene. While this proposed method gave a good yield based on the calcium phosphate consumed, it was found difficult to develop profitably on a commercial scale for the reason that the phosgene had difficulty in penetrating the outside crust of the calcium chloride formed during the reaction.

I have now discovered that phosphorus oxychloride may be produced, and the above mentioned difficulty avoided, by causing phosgene to react with a phosphate of a metal capable of forming a chloride which is fusible at the temperature of the reaction, that is, a temperature between about 300 and 500° C. By proceeding in this way the chloride formed, being liquid at the temperature prevailing in the reaction zone, runs to the bottom of the apparatus leaving fresh surfaces of the metal phosphate exposed to the action of the phosgene.

As typical of phosphates which are suitable for use in my process there may be mentioned ferric phosphate and zinc phosphate.

The reaction takes place as follows:—

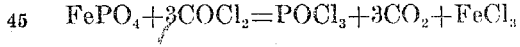

The ferric chloride, which retains only traces of ferric phosphate, may be dissolved in water and transformed again into ferric phosphate by addition of tri-sodium phosphate as follows:—

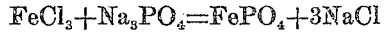

My invention may be illustrated by the following example:—

Ferric phosphate, compressed in the form of pellets, is introduced into a tube or other suitable reaction vessel made, for example, of vitreosil (silica), and heated to a temperature between 325 and 450° C. A stream of phosgene is then passed through the tube in contact with the phosphate. There results a practically theoretical transformation of ferric phosphate into phosphorus oxychloride and ferric chloride. As one of the products of the reaction is in the gaseous state and the other in the liquid state, they flow away in opposite directions, so that the amount of material being acted on tends constantly to decrease. The mass of phosphate in the reaction chamber may be replenished either continuously or at intervals, it being practicable in this way to carry on the operation indefinitely without interruption.

The effluent gas, which contains only carbon dioxide and some undecomposed phosgene, may be sent through a second unit or otherwise utilized for its phosgene content.

I claim:—

1. The process of making phosphorus oxychloride which comprises bringing phosgene into contact, at a temperature between about 300 and 500° C., with a phosphate of a metal capable of forming a chloride which is fusible at the temperature of the reaction.

2. The process of making phosphorus oxychloride which comprises bringing phosgene into contact with ferric phosphate at a temperature between 325 and 450° C.

3. The process of making phosphorus oxychloride which comprises bringing phosgene into contact, at a temperature between about 300 and 500° C., with a phosphate of a metal capable of forming a chloride which is fusible at the temperature of the reaction, and permitting the phosphorus oxychloride and the metal chloride, as soon as they are formed, to flow away from such metal phosphate as remains unchanged.

In testimony whereof I affix my signature.

ROLAND L. ANDREAU.